(12) United States Patent
Huff et al.

(10) Patent No.: US 7,865,837 B1
(45) Date of Patent: Jan. 4, 2011

(54) USER INTERFACE INCLUDING AN ELEMENT FOR SELECTING CUSTOMIZATION OR HELP SCREENS

(75) Inventors: Gerald B. Huff, Berkeley, CA (US); Roy Goldman, Cupertino, CA (US); Craig Carlson, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 141 days.

(21) Appl. No.: 11/494,910

(22) Filed: Jul. 28, 2006

(51) Int. Cl.
*G06F 3/048* (2006.01)

(52) U.S. Cl. ........................ 715/781; 715/811

(58) Field of Classification Search .............. 715/811, 715/781
See application file for complete search history.

(56) References Cited

U.S. PATENT DOCUMENTS

| | | | |
|---|---|---|---|
| 5,500,802 A * | 3/1996 | Morris et al. ............... | 700/182 |
| 5,877,966 A * | 3/1999 | Morris et al. ............... | 716/4 |
| 6,061,060 A * | 5/2000 | Berry et al. ................ | 715/781 |
| 6,684,264 B1 * | 1/2004 | Choi ........................... | 710/15 |
| 7,386,832 B2 * | 6/2008 | Brunner et al. ............. | 717/104 |
| 2002/0138331 A1 * | 9/2002 | Hosea et al. ................ | 705/10 |
| 2002/0194267 A1 * | 12/2002 | Flesner et al. .............. | 709/203 |
| 2003/0004853 A1 * | 1/2003 | Ram et al. .................. | 705/37 |

* cited by examiner

*Primary Examiner*—William L Bashore
*Assistant Examiner*—David Phantana-angkool
(74) *Attorney, Agent, or Firm*—Gunnison, McKay & Hodgson, L.L.P.; Philip McKay

(57) ABSTRACT

A software application displays user interfaces for functionality of the software application. A user interface element is displayed on a user interface for the software application. A configuration screen for user configuration of the software application is displayed in response to a user command indicating selection of said user interface element. The configuration screen includes content corresponding to a state of the software application when the user command is received. The configuration screen may include content based on entered data in the user interface or on a data entry point of the user at the time of selecting the user interface element. The user interface element is displayed in a location on a plurality of user interface screens that is substantially identical for each screen. The configuration screen may include user preferences.

6 Claims, 12 Drawing Sheets

FIGURE 1

TERMS
MANAGING THE PAYMENT TERMS INFLUENCES THE ABILITY TO COLLECT FEES AND IMPACTS CASH FLOW AND ACCOUNTS RECEIVABLES.
 MANAGE PAYMENT TERMS
 ELECTRONIC PAYMENT MECHANISMS TO IMPROVE COLLECTIONS
 ADVANCED AR MANAGEMENT
MORE    OK    CANCEL
FIGURE 5

ELECTRONIC PAYMENT MECHANISMS

ELECTRONIC PAYMENT PROVIDES
AN ALTERNATIVE PAYMENT MECHANISM

☐ ELECTRONIC FUNDS TRANSFER DIRECTLY TO
YOUR ACCOUNTS. SET UP OF EFT SYSTEM

☐ CREDIT CARD PAYMENT VIA ONLINE
PAYMENT SYSTEM. SET UP PAYMENT SYSTEM.

| MORE | | OK | CANCEL |

FIGURE 6

APPOINTMENT BOOKINGS

YOUR CURRENT SETTING BOOKS ALL APPOINTMENTS AS 60 MINUTES. YOUR DENTAL PRACTICE MAY BE BETTER SUITED FOR MORE FLEXIBLE SCHEDULING.

A TASK DRIVEN SCHEDULE ALLOWS YOU TO SELECT THE SERVICES BEING RENDERED AND AUTOMATICALLY A TOTAL TIME IS DETERMINED (EX: SMALL FILLING (30 MIN); LARGE FILLING (45 MIN) TOTAL 1:15). YOU SELECT A START TIME. THIS DOES NOT ALLOW VARIABLE TIME FOR DIFFICULT PATIENTS.

SELECTING START AND END TIMES ALLOWS FULL TIME FLEXIBILITY BUT SERVICES STILL MUST BE ENTERED.

[ MORE ]        [ OK ] [ CANCEL ]

FIGURE 8

SCHEDULE APPOINTMENT
CUSTOMER 
DATE  123
START TIME 
9:00 AM
9:30 AM
10:00 AM
10:30 AM
PROCEDURES
☐ CLEANING    ☐ COMPLEX
☐ FILLING     ☐ POLISH
☐ CROWN
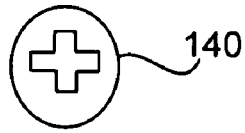 140
FIGURE 9

NOTES
THE NOTE FIELD ALLOWS GENERIC NOTES TO BE ENTERED. ANOTHER OPTION IS A CHECKLIST FOR LESS EXPERIENCED OPERATORS TO GUIDE THEM THROUGH OPTIONS THAT ARE AVAILABLE.
 CHANGE TO CHECKLIST
 KEEP GENERIC NOTES
| MORE | | OK | CANCEL |
FIGURE 11

USER INTERFACE INCLUDING AN ELEMENT FOR SELECTING CUSTOMIZATION OR HELP SCREENS

BACKGROUND

The present invention relates to user interfaces that include a user interface element for customizing a software application.

Different businesses typically use different ways to handle a particular task or workflow. Different businesses using a software application typically desire different features and customization of the software application. A software application typically runs a setup wizard after installation of the application in a computer to allow a user or administrator to configure the operation of the application to the needs and preferences of the user. This initial configuration asks users to make choices when they have no experience with the software, which often leads to incorrect or suboptimal selections. Subsequent changes to these preferences usually require the user to access various menus, dialogs and other user interface controls. Because most applications today have very complex feature sets, the user typically forgets or is not even aware of the various configurations that are available. It is also typically difficult to find the correct set of preferences for any given application functionality inside a large set of preference windows. Changing the configuration of the software application to meet their needs thus becomes a difficult task for the user.

SUMMARY

In various embodiments, a user interface element in a user interface of a software application is adapted to be persistently present in the user interface, and is further adapted to invoke one or more customization screens for user preferences or help screens for assisting the user in customizing user preferences. The customization or help screens may be based on the current state of the software application when the user selects the user interface element.

One embodiment provides a method for displaying user interfaces for user configuration of a software application. A user interface element is persistently displayed on a plurality of user interface screens on a user interface for the software application, and thus is available to the user without having to accesses numerous different menus, dialogs, and other windows. The location of the user interface element on the user interface screens may be substantially identical across the screens. Persistently displaying the user interface element in substantially identical locations on the various user interface screen reinforces to the user the availability of the element and the ability to readily customize the application to the user's preferences.

A state of the software application is determined in response to a user command or action indicating selection of the user interface element. Content is selected based on the state of the software application. A customization screen including the selected content is displayed. In other aspects, the selected content may be based on a previously set user configuration or based on a data entry point of the user at the time of the user command indicating selection of the user interface element.

BRIEF DESCRIPTION OF THE DRAWINGS

FIG. 1 illustrates a first embodiment of a user interface of a software application.

FIG. 5 is a user interface of a first exemplary customization screen.

FIG. 6 is a user interface of a second exemplary customization screen.

FIG. 8 is a user interface of a third exemplary customization screen.

FIG. 9 illustrates a fourth embodiment of a user interface.

FIG. 11 is a user interface of a fourth exemplary customization screen.

Figure 2:
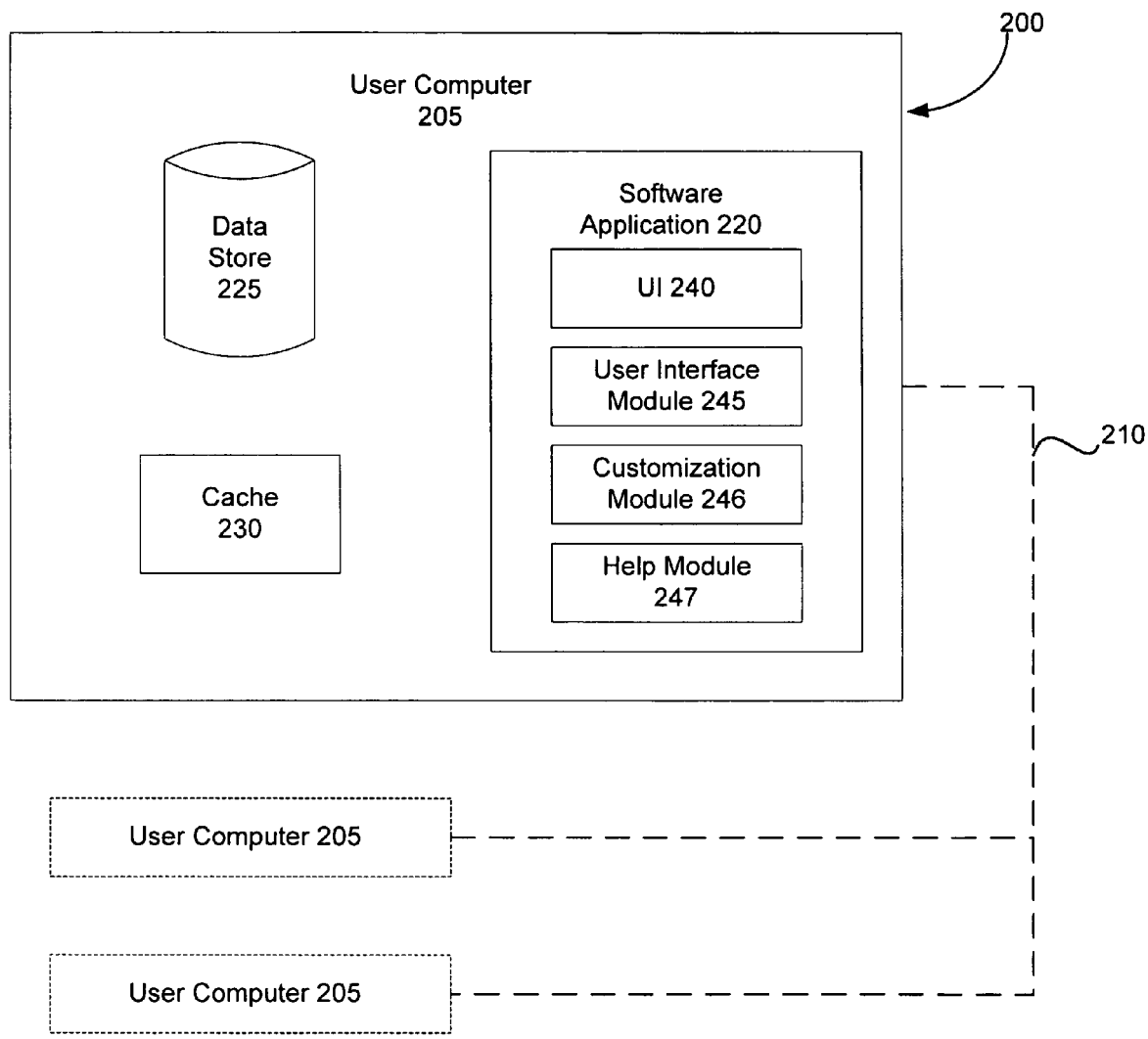
FIG. 2 is a block diagram illustrating the architecture of one embodiment of a system useful for supporting a software application.

One skilled in the art will readily recognize from the following discussion that alternative embodiments of the structures and methods illustrated herein may be employed without departing from the principles of the invention described herein.

DETAILED DESCRIPTION OF THE EMBODIMENTS

According to one embodiment, a software application displays user interfaces including a persistent user interface element for selecting customization of user preferences or displaying help screens for assisting in customizing of user preferences. The software application selects the customization or help screens based at least in part on the current state of the software application when the user selects the user interface element.

Figure 1:
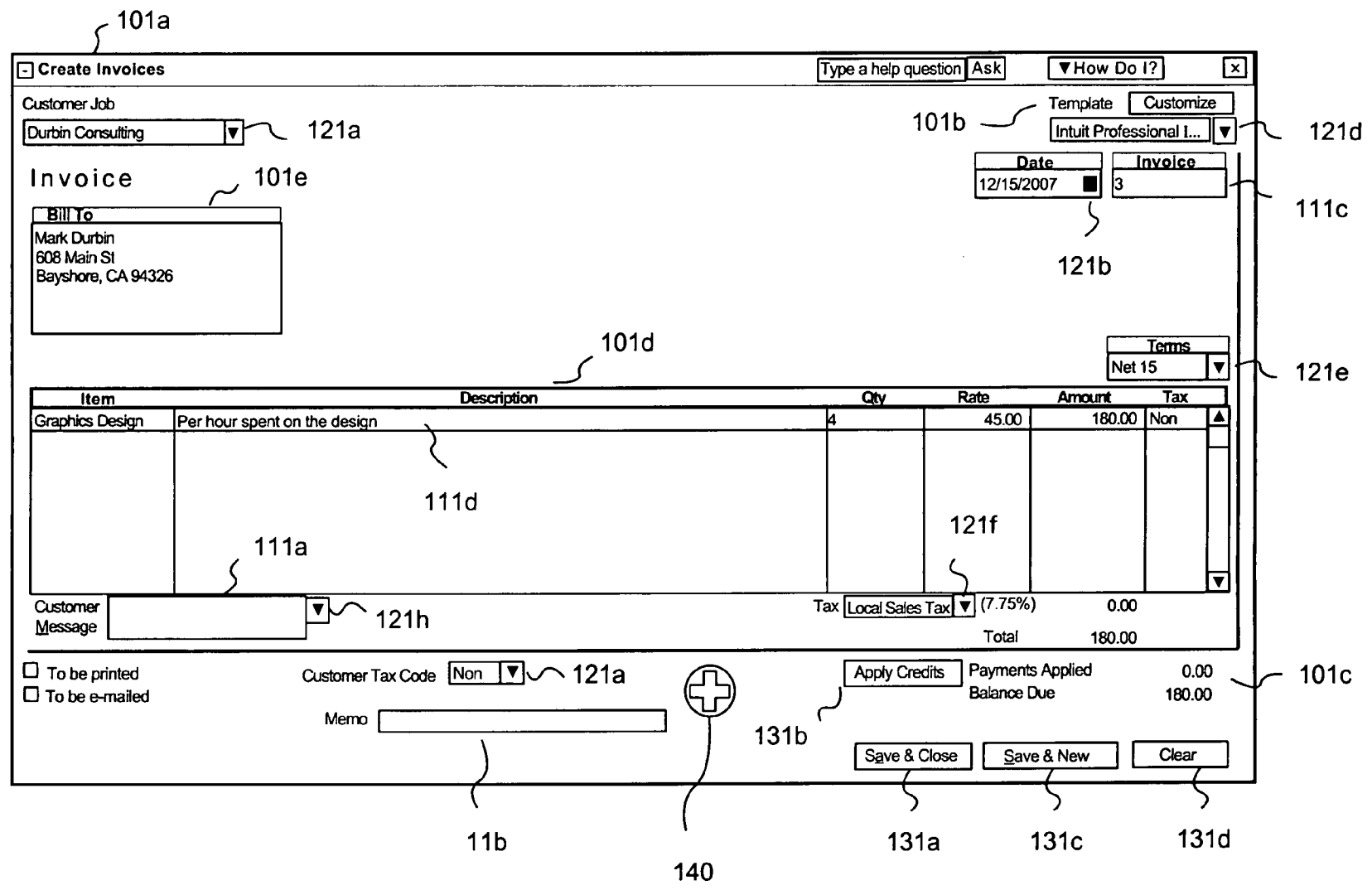

FIG. 1 is an illustration of one embodiment of a user interface of a software application, such as a financial accounting application, displaying an illustrative example of a user interface for creating an invoice. The user interface includes a plurality of display regions 101 for displaying information, a plurality of data entry regions 111 for receiving user inputs via keyboard entry, a plurality of data entry regions 121 displayed as pull-down menus for receiving user inputs, a plurality of data entry regions displayed as buttons 131 for receiving user inputs, and a user interface element 140 for selecting customization or help. The user interface element 140 is depicted in FIG. 1 as a button. The functions of the user interface element 140 also may be activated using a keyboard command or a mouse command. A user selects the user interface element 140 to customize user preferences or to display help screens for assisting in customizing of user preferences. The user interface element 140 may be displayed persistently on the user interface for most or all of the user interface screens of the software application. The user interface element 140 may be displayed in a dialog box, a main application window, an auxiliary window, or other elements displayed by the software application. In one embodiment, the user interface element 140 is displayed in the same or in a substantially identical location on the primary user interface screens. For example, in a financial application, the user interface element 140 may be located in the center along the bottom of the user interface whether the user interface shows an invoice, check reconciliation, accounts payable, accounts receivable or other user interfaces for financial management.

This allows a user to always know where to find the user interface element when the user wants help or to customize preferences. For example, in FIG. 1 the user interface 140 is shown in the bottom center region of the user interface and is in the same or substantially the same region as shown in the user interfaces or FIGS. 7, 9 and 10.

Figure 4:
FIG. 4 illustrates a second embodiment of a user interface.

In another embodiment, the user interface element 140 is displayed in a plurality of locations, such as adjacent to user data entry regions of the screen such as illustrated in FIG. 4. In this embodiment, the user interface element 140 may visually vary, such as gray-out, depending on whether a field is customizable.

FIG. 2 is a block diagram illustrating the architecture of one embodiment of a system 200 useful for supporting a software application 220 for the user interface element 140. In such a system 200, there is provided at least one user computer 205, which may be a stand-alone device or may be communicatively coupled to a network 210.

The user computer 205 is of any type of design, and includes a processor, an addressable memory, and other features (not illustrated) such as a display, local memory, input/output ports, and a network interface. In other embodiments one or more of the components of the user computer 205 may be located remotely and accessed via a network, e.g., 210. The network interface and a network communication protocol provide access to a network 210 and other computers, such as other user computers 205, along with access to the Internet, via a TCP/IP type connection, or to other network embodiments, such as a LAN, a WAN, a MAN, a wired or wireless network, a private network, a virtual private network, or other networks. In various embodiments the user computer 205 may be implemented on a computer running a Microsoft operating system, Mac OS, various flavors of Linux, UNIX, Palm OS, and/or other operating systems.

The user computer 205 includes a software application 220, a data store 225, and a data cache 230. The software application 220 comprises a number of executable code portions and data files. These include code for creating and supporting a user interface 240 according to one embodiment of the present invention, as well as for the customization or configuration features of the user interface element 140.

The software application 220 is responsible for orchestrating the processes performed according to the methods of the present invention. The software application 220 includes a user interface module 245, a customization module 246, and a help module 247 according to one embodiment of the present invention.

The user interface module 245 enables the computer 205 to display the user interface element 140 and to control the functions provided by the software application 220 in response to selection of the user interface element 140. The customization module 246 enables the computer 205 to configure user preferences and to display user interfaces for allowing the user to select such preferences.

The help module 247 enables the computer 205 to display help information to the user for assisting the user in configuring or customizing system preferences based on the state of the software application 220, the state of data entry in the user interface of FIG. 1, the selection of the data entry regions 121 and 131, or a data entry point, such as the location of a cursor in one of the data entry regions 111.

The software application 220 generates customization or help screens based on the current state of the software application when the user selects the user interface element. The software application 220 generates the customization screens using the customization module 246, which includes predefined customization options and corresponding descriptions for element of the user interface. The generation of the customization module 246 is described below in conjunction with FIG. 12.

The above software portions 245-247 need not be discrete software modules. The software configuration shown is meant only by way of example; other configurations are contemplated by and within the scope of the present invention.

The software application 220 may be provided to the user computer 205 on a computer readable media, such as a CD-ROM, diskette, or by electronic communication over the network 210 from a third party computer, such as a distributor of software, for installation and execution thereon. Alternatively, the software application 220, data store 225, and data cache 230 can be hosted on a server computer, and accessed over the network 210 by the user, using for example a browser interface to the software application 220.

The data store 225 may be a relational database or any other type of database that stores the data used by the software application 220, for example account information in the financial management application embodiment referenced above. The data store 225 may be accessible by the software application 220 through the user interface 240. Some data from the data store 225 may be added to the data cache 230 upon initialization of the software application 220. The software application 220 and the data store 225 may be stored and operated on a single computer or on separate computer systems communicating with each other through a network 210.

The data cache 230 is a standard cache of small, fast memory holding recently accessed data. The data cache 230 may include, for example, one or more lists of elements according to one embodiment of the present invention.

One skilled in the art will recognize that the system architecture illustrated in FIG. 2 is merely exemplary, and that the invention may be practiced and implemented using many other architectures and environments.

Figure 3:
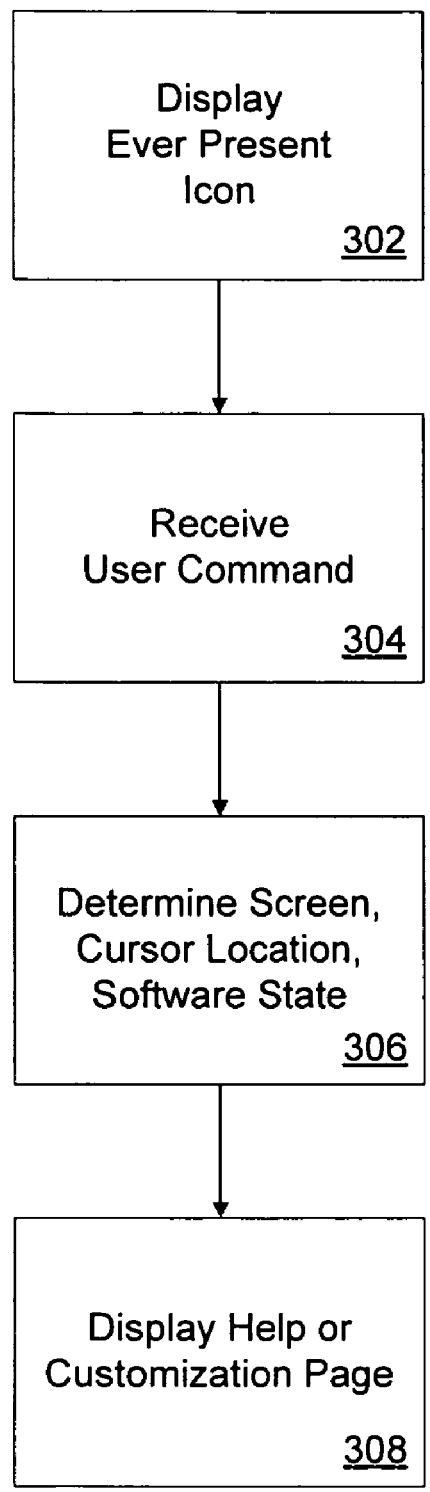
FIG. 3 is a flowchart illustrating the operation of the software application for controlling the user interface element of the user interface of FIG. 1.

FIG. 3 is a flowchart illustrating the operation of the software application 220 for controlling the user interface element 140. The system displays 302 the user interface element 140 on the user interface of the application, such as an interface as illustrated in FIG. 1.

The computer 205 receives 304 user commands, and in response to the user selection of the user interface element 140, determines the state of the software application 220 to analyze the information to be displayed to the user and the customization options. The state of the software application 220 may include data entered in the data entry regions 111 and 121, the user screen, the cursor location on the user interface, or user configuration information, or any combination thereof. The software application 220 displays 308 the help or customization screen or window. The customization screens may be pop-up windows. Examples of customization screens are shown in FIGS. 5, 6, 8, and 11.

The user may then configure the software application 220 using on the customization screen. In another embodiment, the software application 220 displays a portion of the setup wizard or a similar wizard for presenting a series of questions to the user for configuring the system.

An illustrative example of the operation of the user interface element 140 is now described. FIGS. 5 and 6 are user interfaces of exemplary customization screens in response to the selection of the user interface element 140 from the screen of FIG. 1. FIG. 6 is a user interface of an exemplary customization screen in response to the selection of a customization option in the screen of FIG. 5. In these examples it shown that the particular content of the customization screens is based upon the state of the application 200 when the user interface element 140 is selected, including which particular data input fields that user is currently using (e.g., where the cursor or focus is located).

Referring to FIG. 5, there is shown an illustrative example of an invoice customization screen. Here, the customization information for terms for payment is displayed in response to the user selecting the user interface element 140 in the user interface of FIG. 1 if a cursor is in the data entry region 121e. The customization screen includes a description of how managing payment terms influences collections and cash flow. The customization screen of FIG. 5 also includes options that the user can select for managing payment methods and account receivable management. Selecting the electronic payment mechanisms to improve collections causes the software application 220 to retrieve from the customization module a customization screen of FIG. 6 that displays customization features of electronic payment mechanisms. FIG. 6 is a user interface of a second exemplary customization screen in response to selecting the electronic payment mechanism element of FIG. 5. This customization screen allows the user to select electronic payments such as electronic funds transfer or credit card payment.

Figure 7:
FIG. 7 illustrates a third embodiment of a user interface.

Referring to FIG. 7, there shown in a illustrative example of a schedule appointment user interface. The user schedules an appointment of a customer by typing in the information or using pull down menus to enter the customer's name, and set the day and time of the appointment. In this embodiment, each appointment has a predetermined time (e.g., one hour) and only the start time of the appointment is set. Selecting the user interface element 140 causes the software application 220 to retrieve and display the customization screen of FIG. 8.

Referring to FIG. 8, there is shown in an illustrative example of an appointment booking customization screen for the user's business, which in this example is a dental practice. The screen informs the user that the scheduling of FIG. 7 provides fixed appointment intervals of sixty minutes. The customization screen further provides text explaining that it may be better for the dental practice to have more flexible scheduling using task section with the task times to set the duration of the appointment, or the scheduler may select start and end times of the appointment.

FIG. 9 is an illustrative example of a scheduling appointment screen that has been customized based on selecting the task driven element in FIG. 8. The scheduling appointing includes selecting the start time as in the appointment screen of FIG. 7, but further includes a task list for selecting dental procedures that determine the duration of the appointment. As noted above, the appointment user screen of FIG. 9 includes a user interface element 140.

Figure 10:
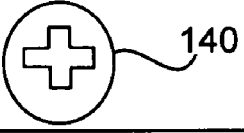
FIG. 10 illustrates a fifth embodiment of a user interface.

FIG. 10 illustrates another embodiment of a schedule appointment user interface with a notes region that allows a user to enter notes about the appointment. In response to a selection of the user interface element 140, the software application 220 retrieves and displays the customization screen of FIG. 11 that allows the user to customize the screen to change to a checklist format for notes.

Figure 12:
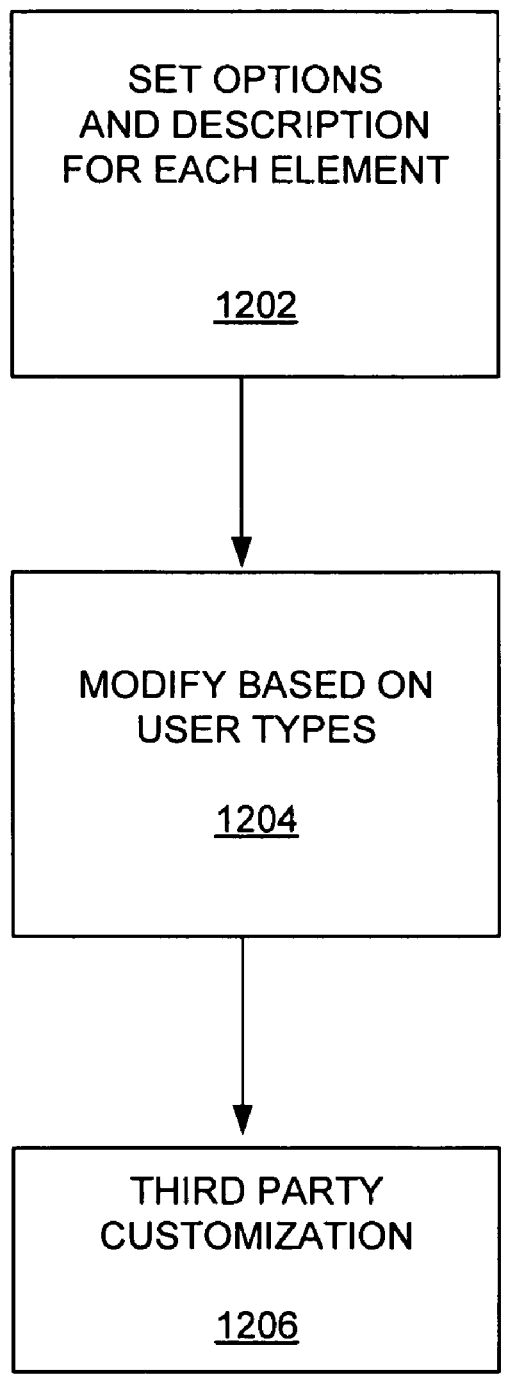
FIG. 12 is a flow chart illustrating the operation of generating a customization module of the software application of FIG. 1.

FIG. 12 is a flow chart illustrating the operation of setting the customization module 246. The customization module 246 includes the customization information for generating a customization screens. The software application developer sets 1202 the options and descriptions for customization for every element in the user interfaces that are generated by the software application 220. The software application developer evaluates all preferences that the user may select in view of the user interfaces of the software application, and determines the customization options and descriptions that are to be displayed based on the state of the software application at the time the user interface element 140 is selected. The software application developer may also use the preferences the user has previously selected and information about the user to determine the customization options. The options and descriptions are modified 1204 based on the user types, such as if the user operates a dental practice, the customization may include information directed to dental practices such as shown in FIGS. 8 and 9. A third party may customize 1206 the options and descriptions for elements. In one embodiment, the third party has expertise in a business, such as a dental practice.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for displaying user interfaces for user configuration of a software application, the method comprising:
   persistently displaying a single entry point user interface button for user configuration of user preferences provided as options for the software application on a plurality of primary user interface screens for the software application, the persistently displayed user interface button being a graphical image displayed on the plurality of primary user interface screens for the software application, the persistently displayed user interface button for user configuration of user preferences provided as options for the software application being displayed in substantially the same location on each of the plurality of primary user interface screens for the software application;
   determining a state of the software application in response to a user command indicating selection of said user interface button for user configuration of user preferences provided as options for the software application, the state of the software application including one or more of currently viewed data previously entered into data entry regions in the user interface currently being displayed to the user, and the cursor location within the user interface being viewed by the user;
   selecting content based on the state of the software application and based on a data entry point of the user at the time of the user command indicating selection of said user interface button for user configuration of user preferences provided as options for the software application; and
   displaying a configuration screen including said selected content in response to the user command indicating selection of said user interface button for user configuration of user preferences provided as options for the software application, the configuration screen including one or more user preferences.

2. The method of claim 1 wherein the selecting content further comprises selecting content based on a previously set user configuration.

3. A computer program product for use in conjunction with a computer system, the computer program product comprising a computer readable storage medium and a computer program mechanism embedded therein, the computer program mechanism including:
   instructions for persistently displaying a single entry point user interface button for user configuration of user preferences provided as options for the software application on a plurality of primary user interface screens for the software application, the persistently displayed user interface button being a graphical image displayed on the plurality of primary user interface screens for the software application, the persistently displayed user interface button for user configuration of user preferences provided as options for the software application being displayed in substantially the same location on each of the plurality of primary user interface screens for the software application;
   instructions for determining a state of the software application in response to a user command indicating selection of said user interface button for user configuration of user preferences provided as options for the software application, the state of the software application including one or more of currently viewed data previously entered into data entry regions in the user interface currently being displayed to the user, and the cursor location within the user interface being viewed by the user;
   instructions for selecting content based on the state of the software application and based on a data entry point of the user at the time of the user command indicating selection of said user interface button for user configuration of user preferences provided as options for the software application; and
   instructions for displaying a configuration screen including said selected content in response to the user command indicating selection of said user interface button for user configuration of user preferences provided as options for the software application, the configuration screen including one or more user preferences.

4. The computer program product of claim 3 wherein the instructions for selecting content further comprises instructions for selecting content based on a previously set user configuration.

5. A system for displaying user interfaces for user configuration of a software application, comprising:
   a processor for executing programs; and
   a software application executable by the processor, the software application including:
   instructions for persistently displaying a single entry point user interface button for user configuration of user preferences provided as options for the software application on a plurality of primary user interface screens for the software application, the persistently displayed user interface button being a graphical image displayed on the plurality of primary user interface screens for the software application, the persistently displayed user interface button for user configuration of user preferences provided as options for the software application being displayed in substantially the same location on each of the plurality of primary user interface screens for the software application;

instructions for determining a state of the software application in response to a user command indicating selection of said user interface button for user configuration of user preferences provided as options for the software application, the state of the software application including one or more of currently viewed data previously entered into data entry regions in the user interface currently being displayed to the user, and the cursor location within the user interface being viewed by the user;

instructions for selecting content based on the state of the software application and based on a data entry point of the user at the time of the user command indicating selection of said user interface button for user configuration of user preferences provided as options for the software application; and instructions for displaying a configuration screen including said selected content in response to the user command indicating selection of said user interface button for user configuration of user preferences provided as options for the software application, the configuration screen including one or more user preferences.

6. The system of claim 5 wherein the instructions for selecting content further comprises instructions for selecting content based on a previously set user configuration.

* * * * *